United States Patent
Conway

(10) Patent No.: US 9,274,912 B2
(45) Date of Patent: Mar. 1, 2016

(54) SIMULATING BURST ERRORS IN MOBILE DATA COMMUNICATION NETWORK SYSTEM LEVEL SIMULATIONS

(71) Applicant: Verizon Patent and Licensing Inc., Arlington, VA (US)

(72) Inventor: Adrian E. Conway, Waltham, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 125 days.

(21) Appl. No.: 14/280,177

(22) Filed: May 16, 2014

(65) Prior Publication Data

US 2015/0331771 A1    Nov. 19, 2015

(51) Int. Cl.
  *H04W 4/00* (2009.01)
  *G06F 11/263* (2006.01)
  *H04W 24/08* (2009.01)

(52) U.S. Cl.
  CPC .......... *G06F 11/263* (2013.01); *H04W 24/08* (2013.01)

(58) Field of Classification Search
  None
  See application file for complete search history.

(56) References Cited

U.S. PATENT DOCUMENTS

| | | | | |
|---|---|---|---|---|
| 5,794,128 A * | 8/1998 | Brockel | ............ | H04B 17/3912 455/506 |
| 6,697,604 B1 * | 2/2004 | Rimpela | ............... | H04W 24/00 455/423 |
| 6,795,427 B1 * | 9/2004 | Klein | ................... | H04B 7/0845 370/347 |
| 6,834,180 B1 * | 12/2004 | Marshall | ............... | H04W 24/00 455/422.1 |
| 6,965,597 B1 | 11/2005 | Conway | | |
| 7,240,252 B1 * | 7/2007 | Fessler | ................ | H04B 17/345 455/67.13 |
| 7,376,132 B2 | 5/2008 | Conway | | |
| 7,760,660 B2 | 7/2010 | Conway | | |
| 8,099,272 B2 | 1/2012 | Conway | | |
| 2003/0060193 A1 * | 3/2003 | Kurita | .................... | H04B 17/00 455/423 |
| 2010/0232299 A1 | 9/2010 | Conway | | |
| 2011/0098054 A1 * | 4/2011 | Gorokhov | ............. | H04B 7/024 455/452.1 |
| 2011/0255430 A1 * | 10/2011 | Wakuda | ................ | H04L 41/145 370/252 |
| 2013/0003687 A1 * | 1/2013 | Woodley | ............... | H04L 5/0007 370/329 |
| 2015/0023188 A1 * | 1/2015 | Das | ....................... | H04W 24/10 370/252 |

OTHER PUBLICATIONS

Giuseppe Piro, et. al., "Simulating LTE Cellular Systems: An Open-Source Framework", IEEE Transactions on Vehicular Technology, vol. 60, No. 2, Feb. 2011, doi: 10.1109?TVT.2010.2091660.
Christian Mehlfuhrer, et. al. "The Vienna LTE Simulators-Enabling Reproducibility in Wireless Communications Research"; EURASIP Journal on Advances in Signal Processing, vol. 2011 (2011), 1-13.

* cited by examiner

*Primary Examiner* — Anh-Vu Ly

(57) ABSTRACT

The disclosed examples provide techniques for simulation of a wireless mobile network that includes block level simulation of burst errors. The simulation allows input of a variable burst error rate to a system level simulation of a communications network. Theoretical error rates are replaced with variable burst error rates in the simulation. Injecting burst errors at the system level provides a network simulation that more realistically reflects the effects of burst errors on network performance.

20 Claims, 6 Drawing Sheets

100

400

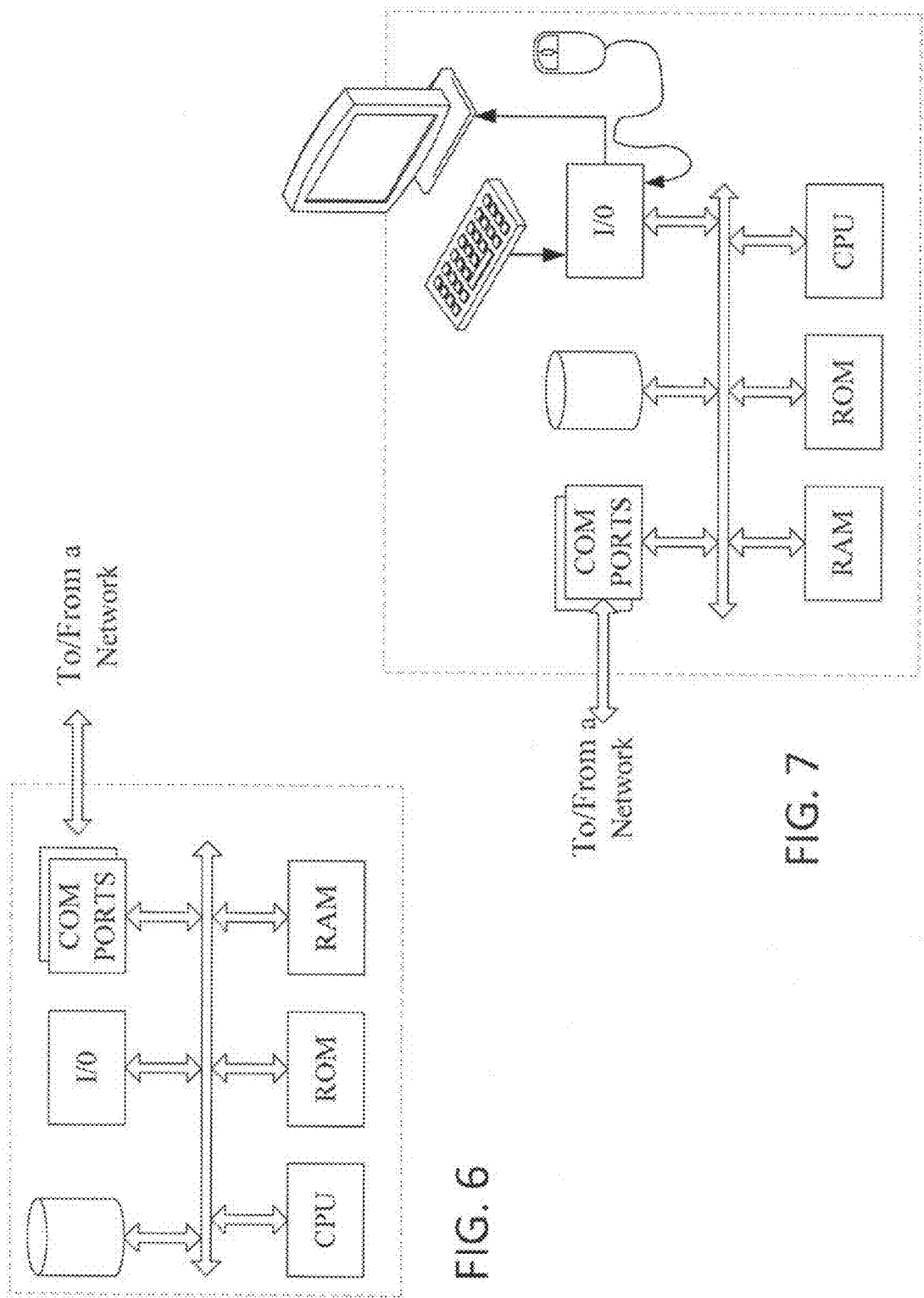

SIMULATING BURST ERRORS IN MOBILE DATA COMMUNICATION NETWORK SYSTEM LEVEL SIMULATIONS

BACKGROUND

Network simulations allow mobile network operators to analyze the effects of different network events (e.g., changeover from one type of wireless network equipment to another) and implementations (e.g., wireless coverage into different areas) prior to installation, upgrade, or reconfiguration of the wireless network components. In discrete-event simulations of networks that include radio access networks such as, for example, long term evolution (LTE) or Wi-Fi, it is desirable in the interest of error modeling fidelity to be able to simulate down to the level of the data transmission of each bit. However, such bit level simulation becomes impractical in network models with a substantial number of wireless network links, network routers, base stations, access points, and user equipment (UE), due to the computational costs in time and data storage space. Simply stated, the large amount of data generated by a large scale bit-level simulation is prohibitive both in time and cost.

While bit-level simulators for LTE systems do exist, their use in the industry is necessarily restricted due to significant volumes of data storage and computation time/resources required to implement even the small simulation models that include, for example, a single eNodeB, or cell, and perhaps two or three UE devices. In such small simulation models, there are only a small number of interfering radio channels to be simulated; and while simulation at the bit level can be practical, the simulation of larger networks in this manner is impractical.

An alternate approach to bit-level simulation is a discrete-event system-level approach. In a discrete-event system-level simulation the bit errors may be extrapolated to a system level error rate by assuming that the error rate is constant in time or random over system level frames. However, this extrapolated system level error rate produces random errors disburst in randomly in time in the simulation results which is not a realistic portrayal of network performance.

Accordingly, present discrete-event system-level simulations are at a disadvantage because using an assumption that the error rate is constant in time or even purely random typically leads to an overestimation of system-level performance. A deployment based on such an overestimation often will not perform as well as predicted by the simulation. As a result, the adoption of a constant frame error rate target in system-level simulation modeling of LTE systems limits the practical validity of the system-level simulation results. For example, overly optimistic estimates of data throughput, latency, a number of dropped packets, packet errors, out-of-order frame delivery, and jitter may be provided by the above referenced system-level simulation techniques. The overly optimistic estimates result in an expected network performance that for some applications (e.g., streaming video, on-line gaming and voice over IP applications) provides the user with a less than satisfying experience with the application and communication network.

Hence, the need for a practical system level simulation that accounts for burst errors remains.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a simplified functional block diagram of a computer that may be configured as a host or server, for example, to function as the network simulator system described with respect to FIG. 3.

FIG. 7 is a simplified functional block diagram of a personal computer or other work station or terminal device used to interact with or execute the network simulation system of FIG. 3.

DETAILED DESCRIPTION OF EXAMPLES

Figure 1:
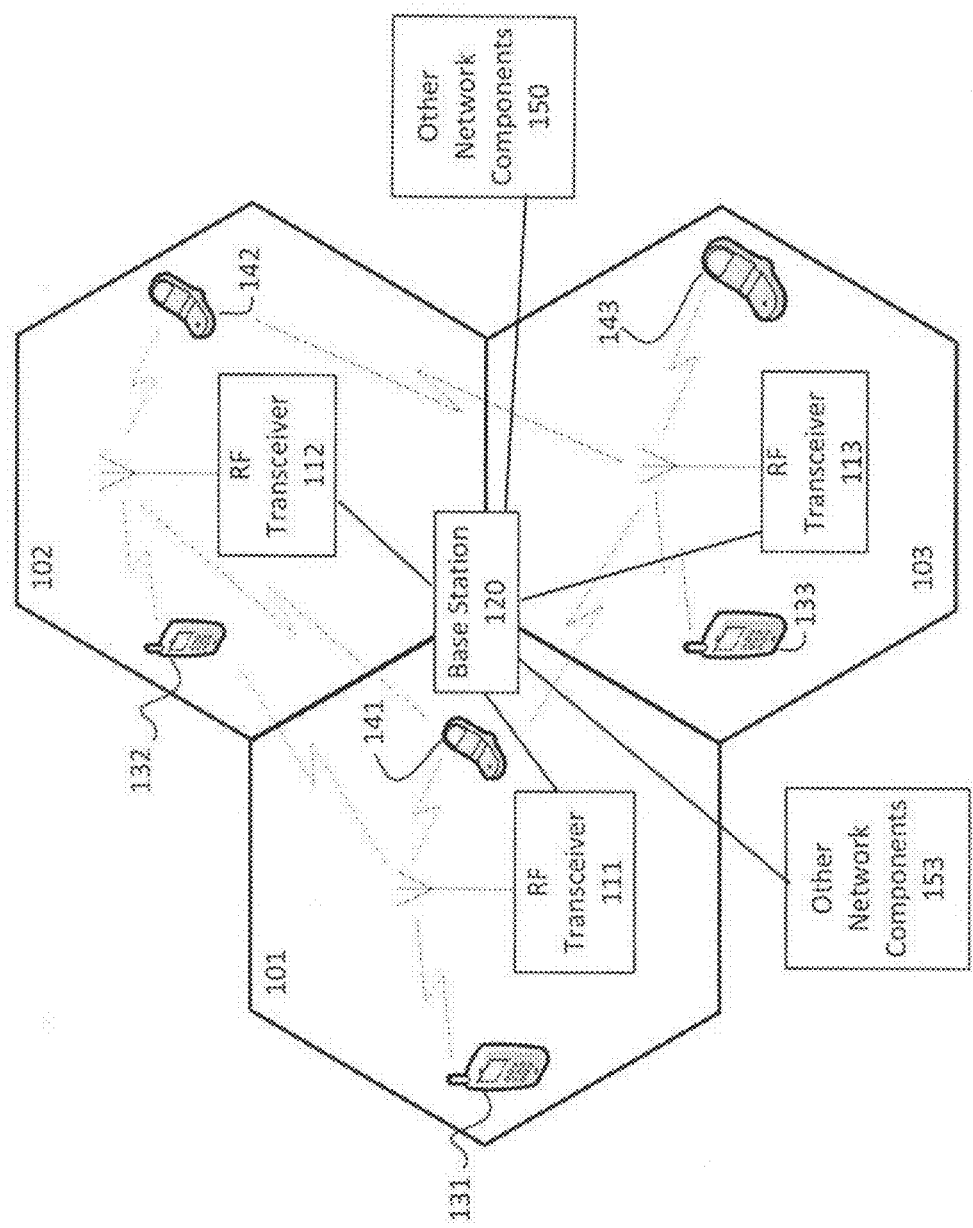
FIG. 1 is a high-level diagram of a network configuration suitable for simulation according to the examples in the following description.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various methods and system examples disclosed herein relate to discrete-event system-level simulations of networks that include radio access networks, such as LTE and Wi-Fi. The described examples provide system-level simulations that take account of bursts of errors in radio access networks. In particular, it is beneficial in the interest of error modeling fidelity to be able to simulate the effects of bursts of errors in data communications. The following examples provide systems and methods to extend the system-level simulation modeling approach to be able to account for bursty bit errors in system-level simulations of LTE networks.

To enable the efficient simulation of larger network models with possibly many radio access networks, eNodeB cells, UE, and application level traffic generators, one approach is to simulate radio access at the media access control (MAC) frame level (which is similar in function to a transport block (TB)-level in LTE) instead of at the bit level. Such a coarser simulation (with respect to the bit-level simulation) is feasible in practice if the MAC frame level error rate is known. If the MAC frame level error rate is known, the MAC frame errors can simply be sampled randomly using the known MAC frame error rate as a parameter. A case where MAC frame level simulation modeling may be viable is when the particular radio access modulation and coding scheme for the radio access network is static, the mobility of the UE is fixed, and the signal-to-interference and noise ratio (SINR) in the respective communication channels is constant in time. A modulation and coding scheme, or MCS, is a setting at which data will be modulated and coded according to a predetermined scheme. A high MCS setting may, for example, indicate a high bit-rate signal modulation that enables a large amount of data to be transferred via communication path, while a low MCS setting may indicate a lower bit-rate signal modulation (with respect to the high bit-rate modulation) and a lesser amount of data to be transferred via the communication path. A reason why the highest MCS setting is not always chosen may be that, when communication channel conditions (e.g., high noise levels due to interference, high usage or the like) are less than desirable, the high MCS setting has a greater chance of producing data errors due to the higher bit-rate and larger amount of data than a lower MCS settings. Therefore, when communication channel conditions degrade network performance, the network usually instructs the respective devices to change MCS settings to a setting considered appropriate for the measured channel conditions.

With a static MCS, fixed mobility, and constant SINR, the MAC frame level error rate will also be a constant, and can be represented as such in a system-level simulation model. However, maintaining constant values for simulation parameters that affect bit errors produces less than realistic simulation results (e.g., system throughput and the like).

However, even in present LTE system simulation models with UE mobility modeling included, there are significant difficulties that arise in attempting to carry out TB (similar to MAC frame) level simulations of radio access. A particular problem in LTE TB simulations is simulating scenarios in which the MCS for each radio access channel for each UE may change dynamically from one scheduling block to another during the simulation, the MCS may change in response to the prevailing channel conditions that have been observed by the UE in an earlier scheduling block and communicated to a network component (e.g., an eNodeB) using a channel quality indicator (CQI) feedback or a CQI observed by the respective network component (e.g., the eNodeB) directly using sounding reference signals (SRS). In a real network implementation, these channel conditions are being continuously measured by the respective network component and the UE. The CQI is, for example, a reflection of the observed SINR, and the SRS is, for example, a signal from a UE that the eNodeB uses to determine a CQI. When channel quality degrades, a lower bit rate MCS is chosen. When channel quality improves, a higher bit rate MCS may be used.

Similar to the above real network implementation, in a network simulation, the MCS selection process tries to choose the highest bit rate MCS that is achievable for a given target MCS block error rate (e.g., a target MCS block error rate of 10%). It should be noted that MCS block error rate is distinct from the above referenced MAC frame or TB error rate. The MCS block error rate is at a higher level of granularity than the MAC frame or TB error rate.

At this point, it may be appropriate to review some basics of scheduling in LTE in terms of scheduling blocks (SB). The following scheduling basics are applicable to both a physical network implementation and a simulation of the network since the simulation will perform similar scheduling functions as the physical network implementation. In LTE, the radio resources between a UE and a cellular base station (e.g., an eNodeB) may be scheduled among UE devices to meet the QoS requirements of the different types of traffic at each UE. Nine standardized QoS Class Identifiers (QCI) are defined corresponding to a range of common service types, such as for example, a VOIP call, a video call, real time online gaming, video streaming, IMS signaling, video, TCP based services, e.g. email, chat, ftp and the like; and Voice, Video, interactive gaming. Each of these standardized QCI also depends on the bearer type (e.g., guaranteed bit rate, non-guaranteed bit rate), priority level (i.e., in a range of 1-9), a packet delay ranging from 50 ms to 300 ms, and an allowed packet loss. The allocation of radio resources may depend upon the QCI assigned to the UE.

The smallest unit of a radio resource (i.e., radio access data) that can be scheduled in LTE is the scheduling block (SB). The scheduling of a radio resource is done over both the frequency domain and the time domain. In LTE, there are two (2) types of frames: a Type 1 frame that is used in Frequency Division Duplexing (FDD); and a Type 2 frame that is used in Time Division Duplexing (TDD). Regardless of the type of frame, the downlink and uplink channels in the air interface are divided into 10 ms frames.

In a Type 1 frame there are ten (10) subframes. Each subframe is one (1) millisecond (ms) in duration and is divided into two (2) time slots. Each individual time slot has a duration of 0.5 ms. Each time slot is divided in the frequency domain into a number of resource blocks (RB). The number of RBs per time slot depends on the radio channel bandwidth. For example, each RB corresponds to a bandwidth of, for example, 180 KHz made up of twelve (12) subcarriers having a bandwidth of, for example, 15 KHz each. In each RB, six (6) or seven (7) orthogonal frequency division modulation (OFDM) symbols (depending on the cyclic prefix being used) are transmitted over each subcarrier using a modulation technique, such as quadrature phase shift keying (QPSK), quadrature amplitude modulation, such as 16-QAM, or 64-QAM. Typically, an SB consists of two (2) consecutive RB.

Alternatively, in a Type 2 frame there are two (2) half frames of 5 ms duration each. Each half frame contains five (5) subframes of 1 ms duration each. The subframes, for example, are numbered 0, 1, . . . , 9. At least one of subframes 1 and 6 may contain switch information, which is information that refers to a downlink pilot time slot (DwPTS), a guard period (GP) and an uplink pilot time slot (UpPTS). Subframes 0 and 5 may be reserved for downlink transmission. The subframe immediately following an UpPTS is reserved for uplink transmission. The other subframes may be used for uplink or downlink transmission. The subframes used for uplink or downlink transmission in a Type 2 frame have the same structure as the subframes in a Type 1 frame.

During a simulation, scheduling decisions, in terms of the assignment of an SB to a UE, are made at the eNodeB for both the uplink and downlink transmission directions. Uplink assignments are communicated from the eNodeB to the UE. The modulation and coding schemes (MCS) to be used by the UE for the assigned SB are also communicated. The assignment of the SB to UE can be made in both time (over various time slots) and frequency (over a RB). A goal of the scheduling is to take advantage of the variations of radio channel quality over time and frequency to maximize some objective function of network performance, such as an average system throughput. In order for channel quality-based scheduling to be performed at the eNodeB, the uplink and downlink channel condition information is available at the eNodeB.

For example, simulated downlink channel condition information is provided by the UE to the eNodeB in the form of channel quality indicator (CQI) reports. CQI reports may pertain to the whole downlink bandwidth (wideband CQI), pre-established sub-bands, or UE selected sub-bands (sub-band CQI).

Meanwhile, uplink channel condition information may be determined by the eNodeB, which measures channel quality through a sounding reference signal (SRS). The SRS is a signal sent by the UE to the eNodeB that allows the eNodeB to determine the quality of the communication channel between the UE and the eNodeB.

In addition, simulated UE capabilities, such as the number of antennae and the type of receiver used for detection, may also be taken into account in order for the eNodeB to select an optimum MCS level for transmission during the simulation. For the same SINR value, the MCS level that can be supported by a UE depends on the UE capabilities. The MCS level may correspond to different bit rates that may be accommodated by a particular MCS. For example, a level 1 MCS level may have a lower bit rate than a level 9 MCS level, which may have the highest bit rate MCS. It is typically expected that a lower level MCS will result in fewer errors at not only the bit-level but also the transport block (i.e. frame) level.

The selected MCS determines the number of bits that are included in a respective TB. In which case, the TB may have a number of bits that requires the TB to span a number of SBs in order for all of the bits in the TB to be transmitted. As a result of the MCS selection process, the MAC frame or TB error rate for each UE depends on the selected MCS being used in each scheduling block (SB) and on the current simulated geographical positions of all of the UEs and network nodes (e.g., eNodeBs) during each respective scheduling block. The simulated current geographical positions of all the UE and eNodeB during each scheduling block are used to determine the SINR for the UE-eNodeB radio channels. The signal-to-interference plus noise ratio (SINR) may be determined using different inputs, but typically an SINR is determined by dividing a value of the received signal power at the UE being evaluated by a sum of the interference and noise power values. Sources of interference include UE that are near by the UE being evaluated, and can include UE from adjacent cells. There may be other sources of interference as well and the distance of the UE under evaluation is relevant to the interference measurement for this determination of interference. In addition, the noise component is the cumulative effects of the local noise condition and a constant noise figure for the UE components.

In network implementations as well as in network simulations, the SINR may, for example, be used to determine a current bit error rate setting during an SB. In either a real network implementation or a network simulation, the current bit error rates determined during the SB translate into MCS block errors. The MCS block errors are determined according to the details of the particular MCS scheme being used for each scheduling block. Determining the resulting MAC frame or TB error rate for each UE is, therefore, not a straightforward calculation without bit-level simulation. Also, the transmission of a MAC frame or TB may span multiple scheduling blocks which further complicates the determination of the overall error rate to use in the simulation of MAC frame errors.

To try to circumvent these simulation difficulties in modeling of an LTE network, one approach in the industry has been to adopt a so-called system-level simulation approach. In this system-level simulation approach, bit errors are not simulated explicitly. Rather, bit errors are modeled indirectly through the simulation of TB errors.

The theoretical TB error rate for a TB is determined in terms of the theoretical MCS block error rate (BLER) of the transmission channels used to transmit the TB. This theoretical TB error rate is then used as the error rate parameter to sample if a TB is to be considered in error or not in the simulation. This system-level approach of sampling TB errors is offered by presently available network simulators, such as in the ns-3 simulator (available from the Internet at the nsnam.org website). For example, the ns-3 simulator includes code that determines whether the TB pointed to is in error or not, but the code as well as other methods of system level modeling presumes that the target MCS BLER is constant in time.

In contrast, the disclosed system-level simulation examples provide system-level simulations results that are based on burst of errors that implies a target MCS BLER that is variable in time, which more accurately reflects the actual network performance results.

Discussion of the disclosed system-level simulation examples will now be made in more detail with reference to the examples illustrated in the drawings and the following text. FIG. 1 is a diagram illustrating example components of mobile communication network. As shown in FIG. 1, base station 120 may service an area divided into one or more cells. As an example, in FIG. 1, base station 120 may include a first cell 101, a second cell 102, and a third cell 103. While FIG. 1 illustrates an example with three cells, base station 120 may service a different number of cells. Each cell of base station 120 may cover a particular geographic area and serve multiple user equipment devices, such as mobile devices 131, 132, 133, 141, 142, and 143. The base station 120 may include a computer processor, a memory and connections to other network components 150 or 153 (such as an IP media subsystem, mobile management entity (MME), a serving gateway (SGW), or the like), and one or more RF transceivers 111, 112, 113. Each cell of base station 120 may be associated with one RF transceiver and one antenna. Thus, cell 101 may be associated with a RF transceiver 111, which serves as a home network to one or more UE, such as mobile devices 131 and 141.

Base station 120 may include one or more computer devices for performing processing functions, such as, for example, identifying a particular UE based on a received signal, and determining a particular MME device or a particular SGW associated with the particular UE.

Each RF transceiver 111-113 may include an RF transmitter that receives signals to be transmitted wirelessly from, for example, UE 131 or 143, and performs signal processing on the signals, and an RF receiver that receives signals from UEs, such as UE 131 or 143, and performs signal processing on the received signals before providing the received signals to base station 120. For example, RF transceiver 111 may perform analog-to-digital and digital-to-analog conversion, modulation and demodulation, up-conversion and down-conversion, and/or amplification of signals. The RF transceiver 111 includes one or more antennas to transmit and/or receive RF signals over the air. While RF transceivers 111-113 are illustrated as located in close proximity to base station 120, the RF transceivers 111-113 may be located remotely from base station 120 and coupled to base station 120 via, for example, fiber optic cables. Thus, cells of base station 120 may be geographically distributed and need not be adjacent each other.

The other network components 150 and 153 may include one or more network elements for communicating with other elements in a network (not shown), such as an IP media subsystem, mobile management entity (MME), a serving gateway (SGW), or the like. For example, other network component 150 may include one or more routers.

Although FIG. 1 shows an example of a network suitable for simulation, other implementations may include additional base stations or may include fewer components, different components, differently arranged components, or additional components than depicted in FIG. 1. The number of components and arrangement of the respective components depends upon the network configuration that is the subject of the simulation. Different components may be added or deleted according to selected data communications network models and inputted system-level network parameters.

Figure 2:
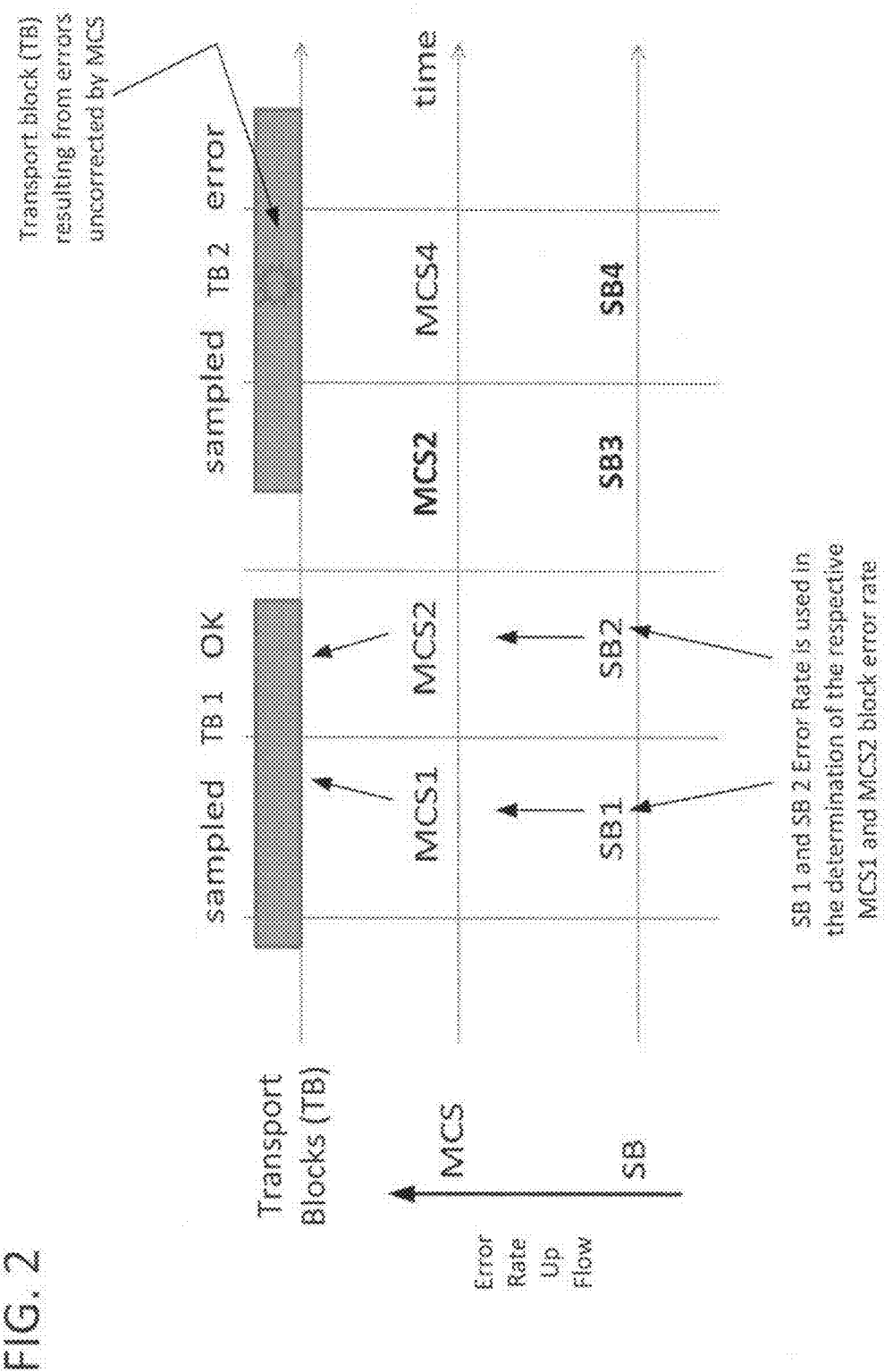
FIG. 2 is a high-level functional block diagram of the relationship between system-level transport blocks, the modulation coding scheme and scheduling blocks to the transport block errors as described in the following examples.

FIG. 2 is a diagram of an example of a system-level simulation of a network. In the system-level simulation, a discrete-event network simulator that samples at the TB level takes into account errors at the SB level. The primary building blocks of the system-level simulation begin at the SB level to coordinate the effective exchange of TB data between a UE and a network component.

As mentioned above, an SB is a block of time in which data will be communicated within a communication channel. A MCS level (e.g., 1 to 31) is assigned to the SB and indicates the MCS that will be used to modulate and code the data for transmission in the communication channel. The MCS "packages" data into discrete MCS blocks of data for transmission according the MCS level. In other words, higher level MCSs (e.g., 64 quadrature amplitude modulation (64-QAM)) include a greater number of bits (e.g. 6 bits) per coding symbol than lower level MCSs (e.g., quadrature phase-shifting keying (QPSK)(e.g., 2 bits)). As a result, the number of bits in each discrete MCS block is dependent upon the MCS level. In addition, as explained above, a TB is also based on time and is typically 10 ms in length. A TB can extend across multiple SBs during which the MCS can change based on channel quality.

As shown in FIG. 2, TB 1 extends across multiple SBs (i.e., SB 1 and SB2) and the data within TB1 is subject to different MCSs (i.e., MCS 1 and MCS 2). In addition, the communication system assigns a data error rate to the respective SB and the TB. In FIG. 2, each SB, SB1-SB4, has an error rate that is determined as the simulation progresses. If SB1 is the first SB in the simulation, it may be assigned a default error rate value that is typical for a network, such as 3% (meaning 3% of all SBs in the simulation will have an error). The error rate for each SB also has an effect on the MCS BLER because the MCS BLER is determined from the SB error rate. In other words, there is an error rate up flow from the SB to the MCS block to the TB. For example, the error rate of SB1 and the error rate of SB2 are used to determine the block error rate for MCS 1 and MCS2, respectively. Subsequently, the MCS BLER and parts thereof that are covered by a TB are input into a function that determines a TB error rate. For example, the TB error rate for TB 1 is determined by an error rate function that takes into account the error rates of SB1 and SB2 and the respective MCS error rates of MCS 1 and MCS 2. The error rate function, in typical simulations, may be a simple probabilistic function or a more complex function that attempts to set the TB error rate so that the overall target error rate (for the simulation) is met with a relatively smooth sampling of errors into the simulation. In other words, each SB has an individual error rate assigned to it, and a number of SBs are encoded according to a MCS for transmission into MCS blocks. The individual SB error rates of the number of SBs in the MCS blocks may be used to determine the MCS BLER.

As shown in FIG. 2, the first TB, TB1, is error free (i.e. "OK") perhaps because any bit errors were corrected by the MCS, either MCS 1 or MCS2. However, during the system level simulation, a network simulator does not simulate at the bit level (i.e., individual is and Os), but samples errors at the TB level in LTE. In other words, at the system level, the simulation does not simulate bit errors, but instead simulates TB errors in LTE (or MAC frame errors).

Typically, system level simulators assume random frame errors and do not capture burst errors. Burst errors typically manifest as a higher concentration of errors over a period of time that is followed by a subsequent period of time having a relatively lower concentration of errors. Or, in other words, a burst error is characterized by a number of data blocks in the identified sample set of data blocks as containing a high number of errors followed by another number of data blocks in the sample set of data blocks as containing a lower number of errors based on the variable burst error rate for the respective communication channel. An advantage of the presently disclosed examples is that the effects of burst errors on the quality of service for particular applications at the application layer (e.g., the effects) may be ascertained, but without the time or computational complexity of a bit-level simulation (e.g., processing and memory resources).

Figure 3:
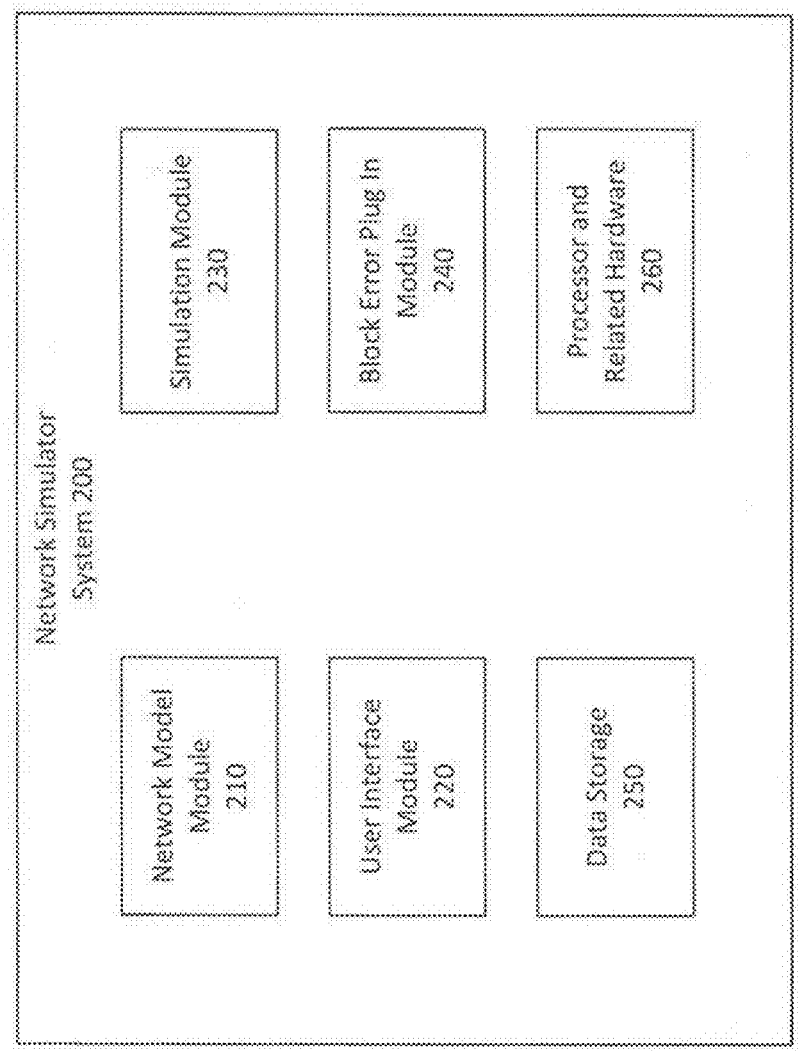
FIG. 3 is a high-level functional block diagram of an example of a network simulator system that implements a system-level network simulation according to the described examples.

System level simulations may be conducted by network simulation systems having a number of different system configurations. FIG. 3 is a high-level functional block diagram of an example of a network simulator system that implements a system-level network simulation and includes examples of components of a network simulator system according to the disclosed examples. FIG. 3 illustrates one example of a network simulation system configuration, but it is envisioned that other network simulation system configurations may utilize the burst error simulation technique. The network simulator system 200 includes one or more computer processor executable programming modules for use in performing a network simulation. The network simulation system 200 includes, for example, a network model module 210, a user interface module 220, a simulation module 230, a block error plug in 240, a data storage 250 and a processor and related hardware 260.

The network model module 210 may be configured in software or hardware to provide a framework from which a simulation of network performance may be performed. For example, a plurality of different types of communication networks, such as LTE, CDMA, IMS, PSTN, have standardized simulation models accessible through the network model module 210. A user interacts with the network simulator system 200 via a graphical user interface, which may be provided by the user interface module 220 and be presented to the user via a display device (which is discussed in more detail with respect to FIG. 7). The network model module 210 provides, for example, network nodes and/or radio access network connectivity having network nodes, such as routers, data network links, clients and servers within cells, end user devices and the like that are used in actual networks. The network simulator system 200 and/or the network model module 210 may include other network model modules, such as a communication data model that represents data traffic (e.g., streaming media, document transfer, web page connections, etc.) and VOIP through the modeled network, as well as other network models.

The user interface module 220 provides user interfaces for implementing a simulation of a network. The provided user interfaces allow a user to manually input network parameter settings, select pre-configured network settings, or otherwise, customize the simulation according to the user's needs, via a user input device(s). In addition, the user interface module 220 allows for the presentation of customized network topography displays and other data visualization on a display device or other device of the network simulation results provided by the simulation module 230.

The simulation module 230 may provide different simulation applications that provide different analysis or simulation algorithms for use by a user. For example, a simulation application (not shown) may include a text-based simulation environment (e.g., employing Visual Basic®, ns-2®, ns-3®, MATLAB®; Octave®; Python®; Comsol Script®; MATRIXx® from National Instruments; Mathematica® from Wolfram Research, Inc.; Mathcad® from Mathsoft Engineering & Education Inc.; Maple from Maplesoft; etc.), a graphically-based simulation environment (e.g., Simulink®, Stateflow®, SimEvents®, etc., by The MathWorks®, Inc.; VisSim® by Visual Solutions; LabView® by National Instruments; etc.), or another type of simulation environment, such as a hybrid environment that includes one or more of the above-referenced text-based environments and one or more of the above-referenced graphically-based environments.

The block error plug in module 240 is a software module that is used by the network simulator system 200 to provide modifications to the error settings based on user selections. For example, the user interface provided by the user interface module 220, allows a user to select a setting indicating that in a system-level simulation all errors generated are to attributed to a transport block or a MAC frame, that the errors are to be burst errors, or the like.

The data storage 250 represents data storage accessible by the network simulator system 200 and may include memory devices co-located with the network simulator system 200 (e.g., hard disc), may be remote memory devices, such as memory maintained by remote servers (e.g., in the "cloud" or at a data center) or may be a combination of both. The data storage 250 may be accessible by the various modules of the network simulator system 200. For example, the network model module 210 may store pre-configured network models in the data storage 250 for later access. Similarly, the simulation module 230 may store simulation results in the data storage 250.

The processor and related hardware 260 of the network simulator system 200 may include a processor for executing program instructions (such as the network simulation), a display device for presenting, for example, a graphical user interface or simulation results to a user according to one or more data visualization concepts, a user input device, such as a keyboard, mouse, touchscreen or the like, an output device, such as a printer, and/or other peripheral devices. Additional examples and details of the processor and related hardware are described with reference to FIGS. 5 and 6.

Figure 4:
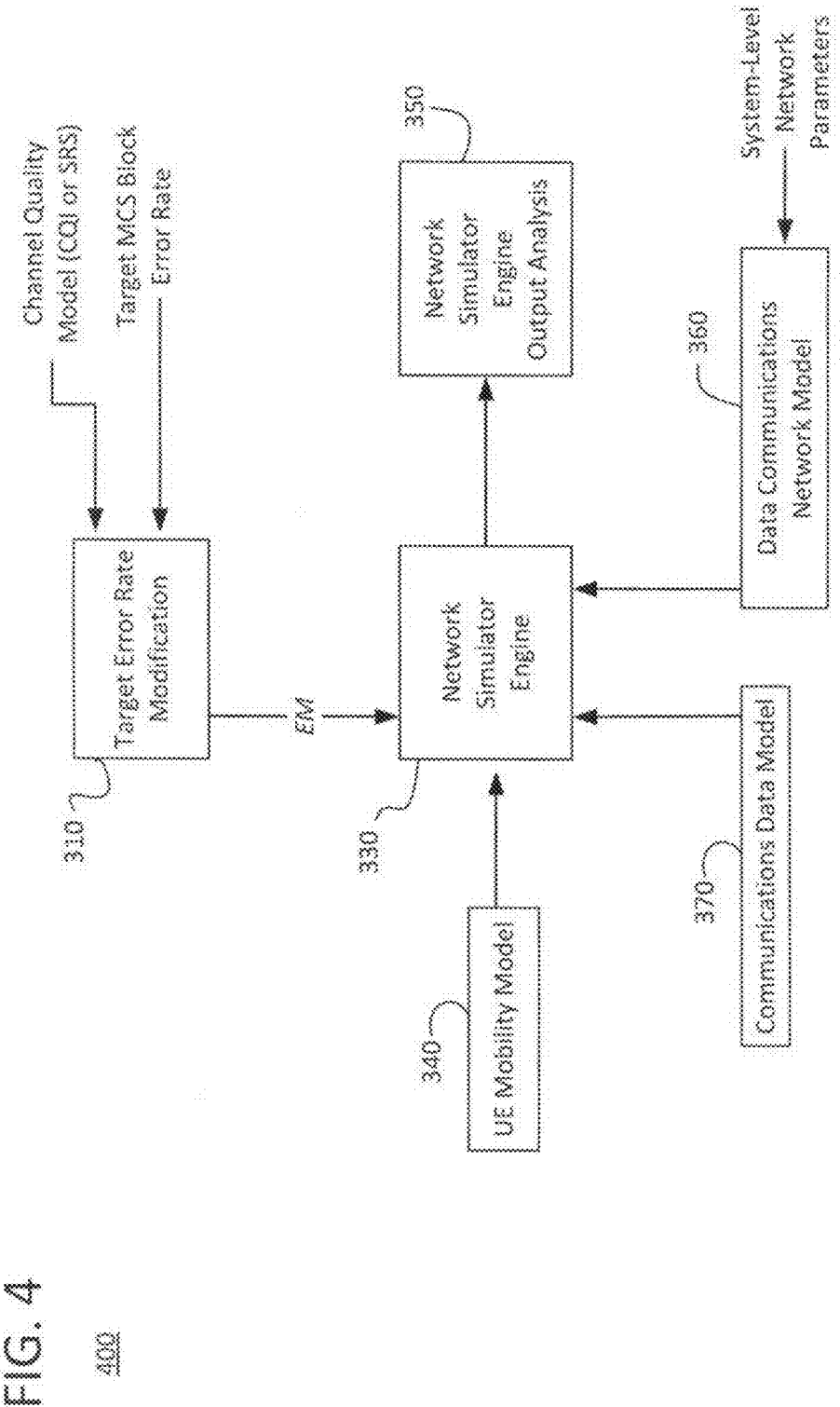
FIG. 4 is a high-level functional block diagram of the interaction between components of the network simulator system example of FIG. 3.

FIG. 4 is a block diagram illustrating the various inputs and functions of a network simulation system, such as the example network simulation system 200 of FIG. 3. In an example of an implementation of a system level network simulation, various pre-defined system-level network parameters are selected according to model-based network configurations or customized network configurations based on user inputs. The system-level network simulation implementation 400 may include a network simulator engine 330 that receives inputs from one or more of a target error rate modification module 310, a user equipment (UE) mobility model 340, a data communications network model 360 and a communications data model module 370. In some examples, the data communications network model module 360 may store or have access to a plurality of data communications network models. Each of the plurality of data communications network models may include a configurable mapping of a plurality of network components that exchange data communications over a plurality of communication channels. The network simulator engine 330 outputs the simulation results to the network simulator engine output analysis module 350. The network simulator engine output analysis module 350 may be configured to cause a processor to process the simulation results according to known techniques.

The network simulator engine 330 executes the network simulation according to inputs from different models available to a user via the network simulation implementation 400. In an example, the UE mobility model module 340 provides to the network simulator engine 330 a model of user equipment movement throughout the network for the duration of simulation. For example, the selected UE mobility model may provide location information for UE simulating the movement of UE into and out of the simulated network as well as movements within the simulated network. For example, a specific UE mobility model for inputting movement data of a number of UE may be selected from a plurality of UE mobility models available from the UE mobility model 340. Different models may be selected for different UE scenarios, such as major sporting events (such as the Super Bowl in New York City), or evaluation network performance in response to damage to infrastructure, such as an ice storm damaging communication towers and cables within a network. The simulation also needs simulated data communications. The communications data model module 370 provides a stream of simulated communication data, such as VOIP data, documents, video, application data traffic, audio, and the like as well as network control and signalling traffic, which simulates communications into, out of and within the simulated network. A communication data model may be selected from a plurality of communication data models available from the communications data model 370 and other various network models that may be available for selection.

When constructing the system level network simulation, different network parameter models may be selected from the network module 201 of FIG. 3. The data communications network model module 360 may allow for selection of a network type. For example, a processor executing the network simulation may retrieve, in response to an input to a user interface selecting a data communications network model from a data store containing a plurality of data communications network models available from the data communications network model module 360. For example, the user interface may present a number of different data communications network models for selection from. The retrieved data communications network may, for example, include the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks. In the case of a cellular network, nodes may employ a wireless communication protocol, such as, Global System for Mobile Communications (GSM), Code-Division Multiple Access (CDMA), Wideband CDMA (WCDMA), General Packet Radio Service (GPRS), Enhanced Data Rates for GSM Evolution (EDGE), another LTE network, and the like. Network nodes within the network may communicate with other network nodes using wireless or wired network standards such as Wi-Fi (e.g., IEEE 802.11x), WiMAX (e.g., IEEE 802.16x), or Ethernet. Network nodes may also include computers, which may include one or more computing modules for hosting programs, databases, and/or applications, such as a routing application.

The selected models may also accept user inputs that allow a user to customize the model by manually entering model parameters. For example, the data communications network model 360 may accept system-level network parameters as an input, and, in response, a data communications network model may be generated that models a data communications network having the inputted system-level parameters. The inputted parameter settings may also provide detailed settings such as including selected network application service settings, which may be applications providing services to selected UE throughout the network.

The selection of network component settings and selection of network application service settings may be received via the user interface and be applied to the data communications network model simulation. For example, the network application service settings may indicate the service provided to different types of users, such as different client devices. Examples of different client devices includes TCP clients, web browsers on a phones, video conferencing application (e.g., SKYPE®) users on phone, or SKYPE® on a computer) servers, network nodes). Additional network parameters may be selected for input by the user. Alternatively, a number of parameters may be set to default values thereby relying on the model. Upon completion of the simulation settings, a data communications network configuration is established for use in a simulation of a system-level operation of the selected data communications network.

The network simulator engine 330 and the other modules of the system-level network simulation implementation 400 may simulate the selected network model or network models in a workstation (e.g., a laptop, desktop, or any other type of computing device, which are described in more detail with respect to FIG. 7) to determine, for example, the performance of the network.

Although other parameters may be used during the simulation, such as network node power levels and other system-level attributes, a target error rate modification module 310 provides system-level parameters for selection of erroneous TBs. For example, in response to an input to the user interface, a system-level variable burst error rate may be identified for application to blocks of data exchanged in each of the communication channels in the data communications network model.

For example, the target error rate modification module 310 may accept as an input a value output by a channel quality model. The value output by the channel quality model may be a channel quality indicator (CQI), which is a value that quantifies the channel quality between a UE (e.g., cellular telephone) and a network node, such as an eNodeB, or a sound referencing signal (SRS), which is a signal generated by the eNodeB to check uplink channel quality between the eNodeB and a UE. In addition, the target error rate modification module 310 may accept as an input a target MCS block error rate value. The target MCS block error rate value may be a value that is based on the simulation results, such as the CQI or SRS, or may be the result of a direct user input. In response to the inputted signals, a variable burst error rate for each data block transmitted in each communication channel may be established in the simulation. In response to the variable burst error rate, the simulation generates bursts of data block errors (i.e., identifies a data block as erroneous based on the variable burst error rate) that are alternating clusters of data blocks having a high number of errors with clusters of data blocks having a lower number of errors. For example, the variable burst error rate may be 40 percent for a respective set of TBs. As the simulation proceeds, the data communication traffic provided by the data communications model module 370 is sampled in which TB (i.e., data blocks) are identified for errors by the network simulator engine 330 at a rate in which 40 percent of the TBs in the data communication traffic is identified as being in error. The variable burst error rate is based on a theoretical target error rate for the simulation of the data communications network model. In an example, even though during the simulation, a modulation and coding scheme level for a subsequent data block (i.e., TB) may be lowered in an attempt to prevent the subsequent data block from being identified as containing errors; the variable burst error rate for the subsequent data block may be maintained.

Using the inputted system level network parameters and the selected models as inputs to the network simulator engine 330, the network simulator engine 330 begins simulating the network. As the network simulator engine 330 begins simulating the system-level operation of the data communication network based on the established data communications network configuration, the selected network component settings, the selected network application service settings, the variable burst error rate for each communication channel, and the identified sample set of data blocks of network data is generated by the simulation. For example, the network simulator 330 may take in the respective inputs for the data communications network model 360, the communications data model 370, the UE mobility model 340, and the target error rate modification 310. Using this information, the network simulator engine 330 may simulate the performance of a data communications network modeled by the model provided by the data communications network model 360. The effect of the burst errors on the simulation is that the burst of errors causes changes in channel quality which causes a cascade of effects of different aspects of the network performance. For example, as network performance degrades, the network takes steps to compensate for the degradation, which may further effect performance of applications executing on the network with respect to, for example, UE 131 and 141 in cell 101 of FIG. 1, or poor network performance in cell 101, results in better network performance in cell 103, or some other effect. The effects of the burst errors are unknown until the network simulator engine 330 generates the network data indicating degraded performance which causes a network response to provide acceptable network performance. For example, a portion of the generated network data may include channel quality indicators for respective communication channels in the simulation. In response to the channel quality indicators, the simulation performed by network simulator engine 330 changes network settings according to the inputted system-level network parameters, the established variable burst error rate, the selected data communications network model as well as other parameters.

For example, in the system level approach using the target error rate modification module 310, the latest CQI for a UE-EnodeB downlink channel or the latest SRS for an uplink radio channel may be used to select the highest speed MCS that will support a given target MCS BLER (e.g., ≈10%). The selection by the MCS error rate determination module 310 may be performed, for example, using look-up tables/graphs of pre-computed results from experiments that show the speeds that different MCS can achieve under various signal-to-interference plus noise ratio (SINR) conditions and MCS block error rates. The selected MCS is applied to a subsequent SB by the network simulation engine 330. The theoretical MCS block error rates for the channels in the subsequent SB may be determined from lookup tables based on the current SINR values observed in the simulation and the type of MCS being applied to the subsequent SB. The theoretical TB error rate in LTE (or a MAC frame) is determined in terms of the theoretical MCS BLER of the transmission channels used to transmit the TB (or MAC frame). This theoretical TB error rate is used as the error rate parameter to sample if a TB is to be considered in error or not in the simulation. The above describe system level approach of TB errors is typical of currently provided simulators, such as ns-3.

However, instead of sampling TB errors directly using the sequence of theoretical TB error rates that are determined in the simulation, the disclosed examples account for bursts of bit errors in system-level simulations of LTE by sampling TB errors (i.e., identifying a TB as erroneous) from the simulated communication data using a modified target TB error rate EM output from the target error rate modification module 310.

The modified frame error rate EM results in simulated sequences of TB errors, in which the sequences of errors are periods of high and low TB errors such that an overall average frame error rate remains equal to an average of the sequence of original theoretical frame error rates being used in the system-level simulation. Of course, there are various ways in which the periods of high and low frame error rates EM can be generated by the target error rate modification 320. Note that the variable burst error rate is maintained regardless of a MCS level parameter setting in the data communications network model.

For example, a first method to generate periods of high and low error rates EM is to use a two-state discrete-time Markov chain to drive a modified TB error rate process. Consider the example of a Markov chain shown in FIG. 5. Whenever the simulation is to sample a new TB error, the Markov chain first makes a state transition according to the transition probabilities $p(1)$ and $p(2)$ shown in FIG. 5.

Figure 5:
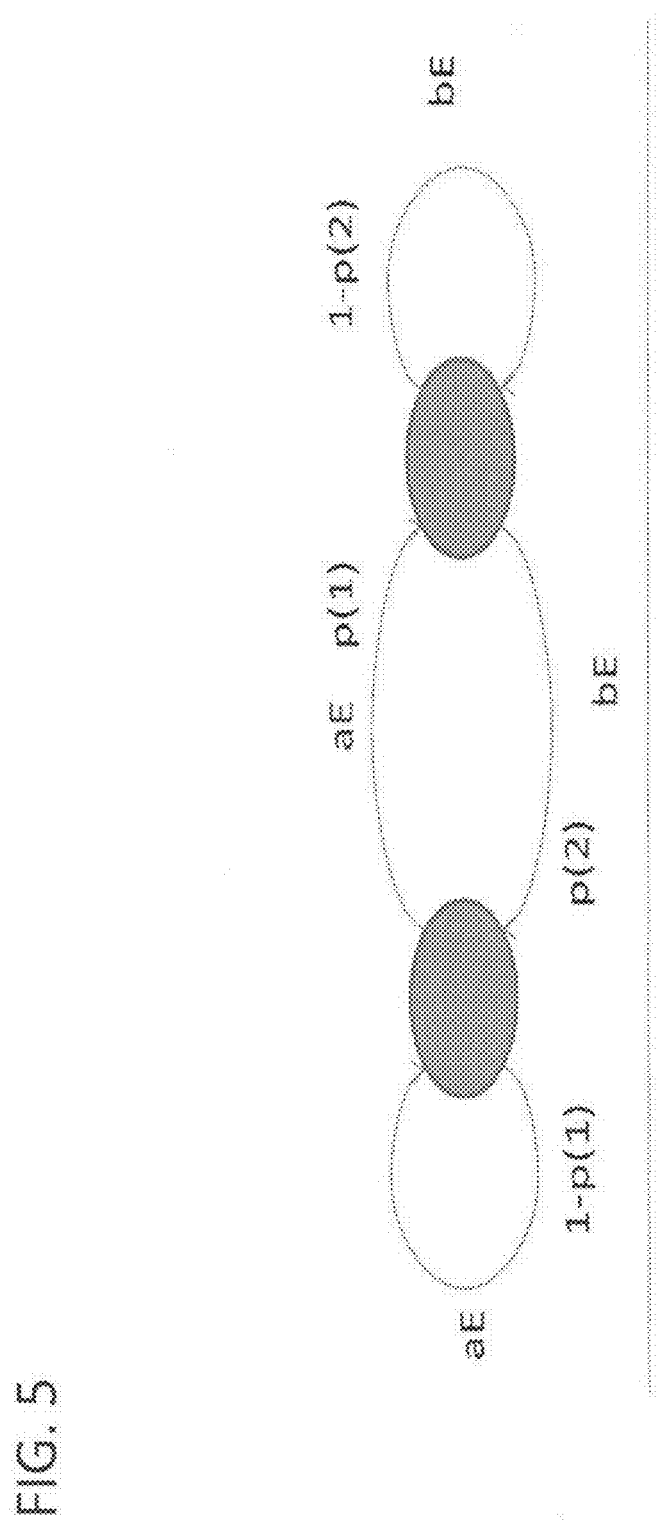
FIG. 5 is an example of a Markov chain used to implement a system level network simulation according to the disclosed examples.

According to the state transition that is realized in FIG. 5, the corresponding sampling TB error rate of either aE or bE is used to sample the TB error, where $a \geq 0$, $b \geq 0$, and E is the theoretical TB error rate that has been provided in the system-level simulation for the particular TB under consideration. This value of E may change from TB to TB during the system-level simulation. The values of coefficients a and b may be chosen, for example, so that the error rate aE is a high error rate and the rate bE is a lower error rate. The value of coefficient b can be set to zero if desired. If the parameters (i.e., coefficients) a, b, $p(1)$, and $p(2)$ are chosen such that $(ap(2)+bp(1))/(p(1)+p(2))=1$ (EQ. 1), then the overall average of the modified sequence of theoretical TB error rates being used in the system-level simulation will be equal to the average of the original unmodified theoretical TB error rates being provided in the system-level simulation. For example, the processor may determine that TB is in error in response to a transition of states of a Markov chain from a first state to a second state according to a pair of transition probabilities. In a specific example, the first state may indicate a high error rate and the second state may indicate an error rate lower than the high error rate of the first state. Of course, in another example, the second state may indicate a high error rate and the first state may indicate an error rate lower than the high error rate of the second state. The processor may proceed by setting a first transition probability function to a first value $p(1)$, setting a second transition probability function to a second value $p(2)$, setting a first sampling TB error rate equal to a constant a times the system level TB error rate, setting a second sampling TB error rate equal to a constant b times the system level TB error rate according to values satisfying equation EQ. 1 above. And, based on the output of Markov chain, determining that a data block contains error and generating an indication of an error. Alternatively, the data block may be determined to not contain and error based on the output of the Markov chain, and an indication of no error may be output.

Another example of a method to generate periods of high and low TB error rates is to consider repeating sequences of N TBs labeled $i=1, \ldots, N$. Let $a(i)E(i)$ be the modified theoretical TB error rate to be used for sampling TB i errors, where $E(i)$ is the original unmodified theoretical TB error rate to be used for sampling TB i and the variable a may be a constant function, and may be $\geq 0$. Then, by choosing certain values for $a(i)$ such that $(a(1)+a(2)+ \ldots +a(N))/N=1$, we can create periods of high and low TB error rates such that the overall average of the modified sequence of theoretical TB error rates being used in the system-level simulation will be equal to the average of the original unmodified theoretical TB error rates being used in the system-level simulation. For example, if N=10 and $a(i)=5, 5, 0, 0, 0, 0, 0, 0, 0, 0$, for $i=1, \ldots, N$, then $(a(1)+a(2)+ \ldots +a(N))/N=1$ is satisfied. The generality of this method also lends itself to constructing a variety of other types of TB error rate behaviours that still ensure that the same averages are maintained.

For example, the target error rate modification module 310 may vary the variable burst error rate by utilizing a repeating sequence of N data blocks, labeled $i=1, \ldots, N$, the variable burst error rate is equal to the function of $a(i)E(i)$. In this example, $E(i)$ is the original unmodified theoretical TB error rate being used for sampling data block i errors, and $a(i)$ values are selected such that $(a(1)+a(2)+ \ldots +a(N))/N=1$. The process may continue for a next TB i+1 by selecting a variable burst error rate equal to $a(i+1)E(i+1)$.

An advantage of the disclosed examples described herein for generating bursty TB errors in system-level simulations of LTE is that the disclosed examples maintain the same average TB error rate as in purely random TB error generation. This maintains the validity of the MCSs that are being chosen in each SB to meet a given constant MCS BLER target.

The network simulator engine 330 outputs the results of the simulation to the network simulator engine output analysis module 350. The network simulator engine output analysis module 350 analyzes the simulation data to make a determination of the network performance. For example, the network simulator engine output analysis module 350 may determine that the network performance at the application level in view of the burst errors is particularly poor under certain network conditions, while under other network conditions, and in view of the same level of burst errors, the application-level network performance is acceptable.

In response to the simulation results, the processor executing the network simulator engine output analysis module 350 may identify a network application from selected network application service settings in which service performance degraded over the course of the simulation in response to bursts of data block errors in a respective communication channel used by the identified network application. For example, the degradation of network performance for an application is based on a diminishing quality of service of the communication channel over which application-specific data is being exchanged between each of a plurality of user equipment and a respective one of the plurality of network components.

The disclosed examples provide a simulation having a higher fidelity to better match the reality of network performance. For example, users are usually most affected by errors that affects application performance. When target error rates are worse, the application level network performance is typically also worse. The quality of service of the application layer is effected by the bit errors at the lowest levels, and the examples of burst errors at the system-level more accurately reflects the effects of the bit errors to the application layer than prior system level simulations. As outlined by the discussion of examples above, network simulation is typically implemented by execution of programming on one or more computers. The simulation for example may run on a user terminal device or may run in a server accessing via a network by a user at a terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of workstation or terminal device, although the computer of FIG. 7 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems, and programming languages of such servers are conventional in nature. Of course, the server functions may be implemented in a distributed fashion on a number of similar platforms, to distribute the processing load.

A computer type user terminal device, such as a workstation, PC, or tablet computer, similarly includes a data communication interface CPU, main memory and one or more mass storage devices for storing user data and the various executable programs (see FIG. 7). The workstation may include one or more computing modules for hosting programs, databases, and/or applications, such as a network simulation application. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. The hardware elements, operating systems, and programming languages of such user terminal devices also are conventional in nature.

Hence, aspects of the methods of generating burst errors outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network simulation provider into the computer platform of the user that will be the network simulation server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the generation of burst errors, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
simulating, by a processor, system-level operation of a data communication network based on an established data communications network configuration including a plurality of communication channels, selected network component settings, selected network application service settings, an identified sample set of data blocks, a variable burst error rate for each of the plurality of communication channels, wherein the variable burst error rate for each of the plurality of communication channels is a simulation parameter that results in generation of bursts of data block errors that are a higher concentration of errors over a period of time that is followed by a subsequent period of time having a relatively lower concentration of errors;
for each communication channel of the plurality of communication channels in the simulation, identifying data blocks in the sample set of data blocks as containing bursts of data block errors; and
identifying, by the processor, a network application from the selected network application service settings in which service performance of the identified network application degraded over the course of the simulation in response to the bursts of data block errors in the respective communication channel used by the identified network application.

2. The method of claim 1, further comprising:
establishing via the processor, a data communications network model comprising a configurable mapping of a plurality of network components that exchange data communications over a plurality of communication channels;
receiving, via a user interface, the selection of network component settings and the selection of network application service settings to be applied to the data communications network model;
establishing the data communications network configuration by setting the configurable mapping of the plurality of network components in the data communications network model for use in the simulation of the system-level operation of the simulation data communications network;
in response to an input to the user interface, identifying the variable burst error rate to be applied to data blocks in the sample set of data blocks, wherein the data blocks are exchanged in each of the communication channels in the data communications network model;
establishing a variable burst error rate for each data block transmitted in each communication channel; and
selecting a sample set of data blocks as data communication traffic for each channel for use in the simulation.

3. The method of claim 1, wherein the variable burst error rate is based on a theoretical target error rate for the simulation of a data communications network model.

4. The method of claim 1, further comprising:
for each communication channel in the simulation, varying the variable burst error rate to a subsequent variable burst error rate by performing steps of:
transitioning states of a Markov chain from a first state to a second state according to a pair of transition probabilities, wherein the first state indicates a high error rate and the second state indicates an error rate lower than the high error rate of the first state.

5. The method of claim 1, further comprising:
for each communication channel in the simulation, varying the variable burst error rate to a subsequent variable burst error rate by performing the steps of:
setting a first transition probability function p(1) to a first value;
setting a second transition probability function p(2) to a second value;
setting a first sampling data block error rate equal to a variable a times a system level data block error rate, wherein a value of the variable a is a real number greater than or equal to 0;
setting a second sampling data block error rate equal to a constant b times the system level data block error rate, wherein a value of the variable b is a real number greater than or equal to 0; and
wherein the values of a, b, p(1) and p(2) satisfy the equation of:

$$(ap(2)+bp(1))/(p(1)+p(2))=1; \text{ and}$$

determining that a data block contains an error based on based on the output of the equation (ap(2)+bp(1))/(p(1)+p(2))=1.

6. The method of claim 1, further comprising:
for each communication channel in the simulation, varying the variable burst error rate to a subsequent variable burst error rate by performing the steps of:
utilizing a repeating sequence of N data blocks, labeled i=1, . . . , N, wherein N is an integer, the variable burst error rate is equal to the function of a(i)E(i), where a is a constant function having a real number value ≥0, E(i) is the original unmodified theoretical data block error rate being used for sampling data block i errors, and a(i) values are selected such that (a(1)+a(2)+ . . . +a(N))/N=1, wherein the system simulation ends after a last sequence of N data blocks has repeated; and
selecting a variable burst error rate for a next data block i+1, wherein the selected burst error rate is equal to a(i+1)E(i+1).

7. The method of claim 1, wherein the degradation of network performance for an application is based on a diminishing quality of service of the communication channel over which application-specific data is being exchanged between each of a plurality of user equipment and a respective one of the plurality of network components.

8. The method of claim 1, wherein the variable burst error rate is maintained regardless of a modulation coding scheme parameter setting in a data communications network model.

9. The method of claim 1, wherein:
for each communication channel in the simulation, a data block in the identified sample set of data blocks spans a number of scheduling blocks of data generated during the simulation, and
the number of scheduling blocks generated during the simulation is determined based on a duration of the simulation.

10. The method of claim 1, wherein, for each communication channel in the simulation, a data block in the identified sample set of data blocks spans a plurality of modulation coding scheme blocks generated during the simulation.

11. The method of claim 1, further comprising steps of:
for each communication channel during the simulation, modifying a modulation and coding scheme level for a subsequent data block; and
in response to the modification of the modulation and coding scheme level, maintaining the variable burst error rate for the subsequent data block.

12. A system, comprising:
a data storage storing data communication network models and program instructions; and
a processor coupled to the data storage, wherein the processor is configured to perform functions, including functions to:
simulate a system-level operation of a data communication network based on an established data communications network configuration, a selected network component settings, a selected network application service settings, a variable burst error rate for each communication channel in the established data communications network configuration, and an identified sample set of data blocks;
for each communication channel in the simulation, identify a burst of data block errors, wherein a burst of data block errors is a number of data blocks in the identified sample set of data blocks as containing a high number of errors followed by another number of data blocks in the sample set of data blocks as containing a lower number of errors based on the variable burst error rate for the respective communication channel, and the high number is greater than the lower number; and
identify a network application from the selected network application service settings in which service performance of the identified network application degraded over the course of the simulation in response to the bursts of data block errors in a respective communication channel used by the identified network application.

13. The system of claim 12, wherein the processor is further configured to perform functions, including the functions of:
establish a data communications network model comprising a configurable mapping of a plurality of network components that exchange data communications over a plurality of communication channels;
receive, via a user interface, the selection of network component settings and the selection of network application service settings to be applied to the data communications network model;
establish the data communications network configuration by setting the configurable mapping of the plurality of network components in the data communications network model for use in the simulation of the system-level operation of the simulation data communications network;
in response to an input to the user interface, identify the variable burst error rate to be applied to blocks of data exchanged in each of the communication channels in the data communications network model;
establish the variable burst error rate for each data block transmitted in each communication channel; and
select the sample set of data blocks as data communication traffic for each channel for use in the simulation.

14. The system of claim 12, wherein, for each communication channel in the simulation, the variable burst error rate is based on a theoretical target error rate for the simulation of a data communications network model.

15. The system of claim 13, wherein, for each communication channel in the simulation, the processor is further configured to vary the established variable burst error rate by performing the function of:
transition states of a Markov chain from a first state to a second state according to a pair of transition probabilities, wherein the first state indicates a high error rate and the second state indicates an error rate lower than the high error rate of the first state.

16. The system of claim 13, wherein, for each communication channel in the simulation, the processor is further configured to vary the established variable burst error rate by performing the functions of:
set a first transition probability function p(1) to a first value;
set a second transition probability function p(2) to a second value;
set a first sampling data blocks error rate equal to a variable a times a system level data blocks error rate, wherein a value of the variable a is a real number greater than or equal to 0;
set a second sampling data blocks error rate equal to a variable b times the system level data blocks error rate, wherein a value of the variable b is a real number greater than or equal to 0; and
wherein the values of a, b, p(1) and p(2) satisfy the equation of:

$(ap(2)+bp(1))/(p(1)+p(2))=1$; and determine that a data block contains an error based on based on the output of the equation $(ap(2)+bp(1))/(p(1)+p(2))=1$.

17. The system of claim 12, wherein, for each communication channel in the simulation, the processor is further configured to vary the established variable burst error rate by performing the functions of:
utilize a repeating sequence of N data blocks, labeled i=1, ..., N, wherein N is an integer, the variable burst error rate is equal to the function of a(i)E(i), where a is a constant function having a real number value ≥0, E(i) is the original unmodified theoretical data block error rate being used for sampling data block i errors, and a(i) values are selected such that (a(1)+a(2)+ ... +a(N))/N=1, wherein the system simulation ends after a last sequence of N data blocks has repeated; and
selecting a variable burst error rate for a next data block i+1, wherein the selected burst error rate is equal to a(i+1)E(i+1).

18. The system of claim 12, wherein the degradation of network performance for an application is based on a diminishing quality of service of the communication channel over which application-specific data is being exchanged between each of a plurality of user equipment and a respective one of the plurality of network components.

19. The system of claim 12, wherein, for each communication channel in the simulation, the variable burst error rate is maintained regardless of a modulation coding scheme parameter setting in a data communications network model.

20. The system of claim 12, wherein:
for each communication channel in the simulation, a data block in the identified sample set of data blocks spans a number of scheduling blocks of data generated during the simulation, and
the number of scheduling blocks generated during the simulation is determined based on a duration of the simulation.

\* \* \* \* \*